No. 838,547. PATENTED DEC. 18, 1906.
A. KIMBLE.
ELECTRIC MOTOR AND METHOD OF CONTROLLING THE SAME.
APPLICATION FILED MAY 21, 1906.
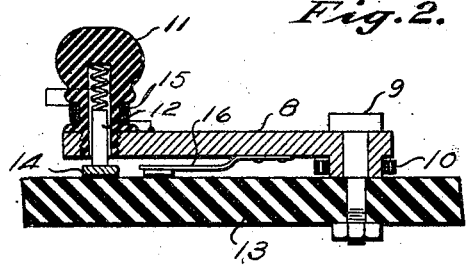
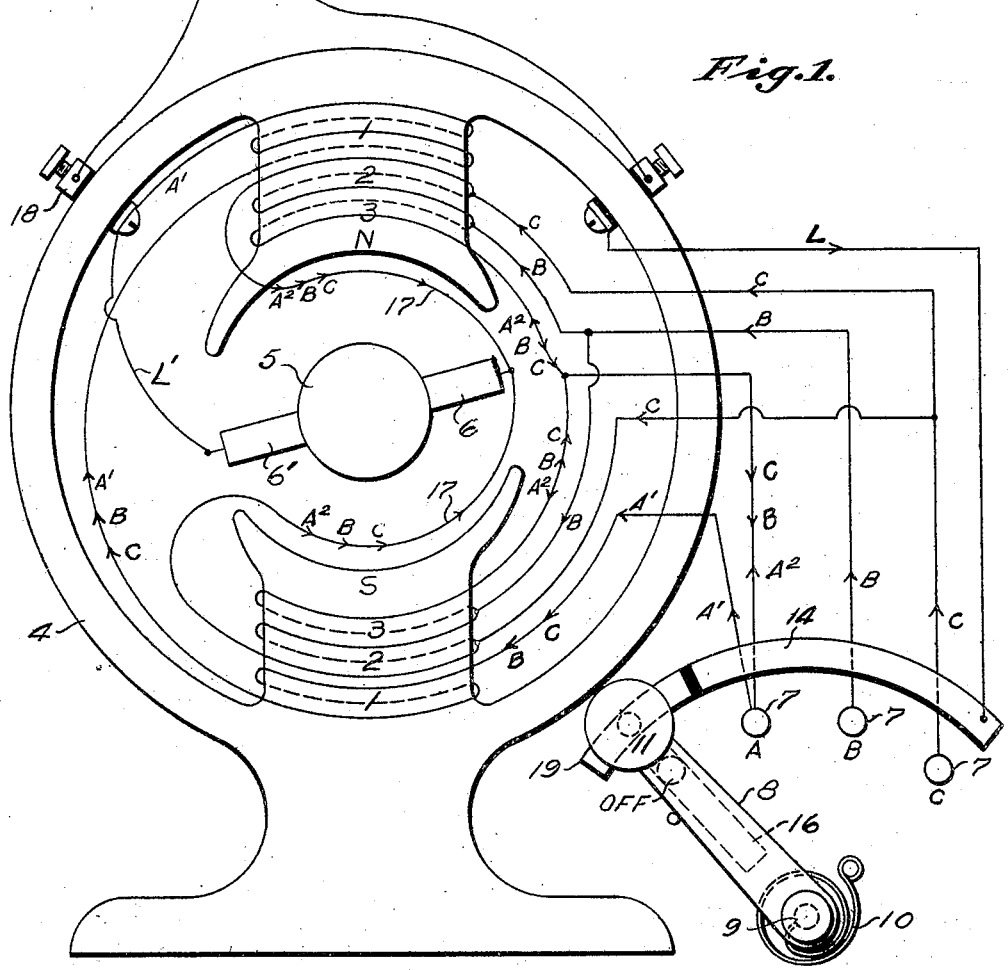
Witnesses: Inventor,
Austin Kimble,
by Rummler & Rummler
Attorneys.

UNITED STATES PATENT OFFICE.

AUSTIN KIMBLE, OF CHICAGO, ILLINOIS, ASSIGNOR OF ONE-HALF TO PERKINS B. BASS, OF CHICAGO, ILLINOIS.

ELECTRIC MOTOR AND METHOD OF CONTROLLING THE SAME.

No. 838,547.  Specification of Letters Patent.  Patented Dec. 18, 1906.

Application filed May 21, 1906. Serial No. 318,061.

*To all whom it may concern:*

Be it known that I, AUSTIN KIMBLE, a citizen of the United States of America, and a resident of Chicago, in the county of Cook and State of Illinois, have invented certain new and useful Improvements in Electric Motors and Methods of Controlling the Same, of which the following is a specification.

The main object of this invention is to provide an improved form of motor in which the field-windings are so arranged that the motor may be controlled in a simple manner without using outside resistance and to provide an improved form of controller-arm which will automatically return to the "off" position when the circuit is broken. These objects are accomplished by the device shown in the accompanying drawings, in which—

Figure 1 is a diagrammatic view of a motor and controller constructed according to this invention. Fig. 2 is a section of the controller, showing the spring for urging the lever to its off position and showing the arrangement of the magnet and armature for securing the controller-lever against the action of said spring.

In the form shown in the drawings the field-magnet 4 consists of a circular frame having a pair of opposed cores N S, each provided with a plurality of sets of windings. The armature is indicated at 5, and the brushes at 6. The field-cores are compound wound. The windings 1 are a shunt of the armature-circuit, while the windings 2 and 3 are in series with the armature. The windings 2 and 3 on the two cores are connected in parallel.

The controller consists of a series of contact-points 7, which are respectively connected in parallel with the successive joints between the sets of series windings on each core. The controller-arm 8 is pivoted at 9 and is normally urged toward its off position by means of a spring 10. The controller-arm is arranged to connect the contact-points with the line conductor L, and the other line conductor L' connects with the brush 6', as in Fig. 1. The handle 11 of the controller-arm is hollow and has a magnet-core 12, mounted therein and normally urged toward the plate 13.

A strip of iron 14 is arranged concentrically of the contact-points 7 and forms the armature for the magnet 12. The magnet-core 12 is of soft iron and is magnetized by the coil 15, which is connected both to the core 12 and to the arm 8. The strip 14 is connected with the line conductor L and forms a part thereof. The controller-arm 8 serves to connect the line L with either contact-point, and whenever the arm 8 is opposite either of the contact-points 7 current will flow through the coil 15, causing the magnet to hold the arm against the pull of the spring 10. In order to illustrate the distribution of the current, the contact-points 7 are also designated by letters of the alphabet, and the similar reference-letters are placed upon the conductors, which receive current from the respective contacts. The arrow-heads indicate the direction of the current in each case.

The line conductor L' is connected with the brush 6' and also with the shunt-coils 1 of the field, which are in series with each other. The other end of said shunt-coils 1 is connected with the contact-button A, this circuit being indicated by the character A'.

The series windings 2 and 3 of each field-core are connected in parallel, one end of each being connected with the brush 6 and the other ends being connected with the contact-button A, the circuit being designated $A^2$. The joints between the individual sets of windings 2 and 3 of each field-core are connected in parallel with the second contact-button 7, the current being designated B. The third contact-point is connected by parallel conductors with the ends of the series windings 2 at their points of junction with the conductors 17.

In the drawings only two sets of series windings are indicated on each core; but it will be understood that in practice there would usually be a greater number of sets of series windings and a correspondingly greater number of contact-points in the controller, depending upon the range of speeds at which the motor is to run. The motor requires no outside resistance for controlling the speed, so that the base-plate 13, which supports the controller, is usually fastened directly upon one side of the frame of the motor. The conductors which connect the contact-points with the field-windings are comparatively short and hidden by the frame of the machine.

The operation of the device shown is as follows: When the controller-lever is in the position shown in Fig. 1, the line-circuit is broken and the motor is accordingly stopped. The magnet-core 12 in this case rests upon a strip 19, which forms an extension of the iron strip 14 and is insulated therefrom. When the lever is now swung so as to bring the shoe 16 into engagement with the A contact-point, current will flow over the circuit A' and A² and pass through the shunt-windings 1 and all of the series windings 2 and 3, and the fields will therefore have their maximum strength, and the motor will run at its slowest speed. As soon as the magnet-core 12 passes upon the bar 14 current will pass through the magnet-coil 15, and the arm 8 will be held against the action of the spring 10, although it may be easily slid by the operator into contact with other contact-points. When the arm 8 is shifted into contact with the contact-point B, the current will follow the circuits designated B. After leaving the contact B the current divides and enters both field-windings at the joints between the sets 2 and 3. Here it again divides in each case. Part of this current flows through the coils 2, then through the conductors 17, and then through the armature, while the other part passes through the coils 3 in a reverse direction, as shown by the arrows B, then passing the contact-button A, and flowing through the shunt-coils 1 to the line conductor L'. The coil 3 now opposes the coils 1 and 2, weakening the field and increasing the speed of the motor. When the controller-arm is in contact with the contact-point C, the current flows over all of the series windings in a reverse direction to that of the current in the shunt-windings. Any desired range of speed may therefore be had by providing the proper number of sets of windings and proportioning the shunt and series windings.

In the diagrammatic representation which I have shown no attempt has been made to indicate the relative number of turns in the respective sets of windings. My aim has been more to illustrate the principles upon which my motor operates.

What I claim as my invention, and desire to secure by Letters Patent, is—

1. A dynamo-electric machine, comprising an armature, a field-core having both series and shunt windings thereon, a contact-point at the junction of said shunt and series windings, a second contact-point and conductor short-circuiting said series winding, and a contact member connected in the circuit and movable into contact with either of said contact-points for controlling the direction of the current in said series winding, substantially as described.

2. In a dynamo-electric machine, the combination of a field-magnet core having thereon a plurality of sets of windings connected in series with each other, a series of contact-points respectively connected with the joints between different sets of said field-windings, an armature-circuit connected in series with said windings, a shunt-conductor bridging said windings and armature-circuit, and a controller member connected in the circuit and movable along said series of contact-points for controlling the flow of current through said field-windings.

3. A direct-current dynamo-electric machine, comprising a rotatable armature, a field-core having a pole adjacent to the armature, a plurality of sets of windings on said core, and controlling means arranged to cement some of said windings in shunt with the armature while others are in series, said controlling means being adapted to cut out some of the series windings and cause a reversal of the current therein without changing the direction of that in the remaining windings.

4. In a dynamo-electric machine, the combination of a field-magnet comprising a plurality of cores each having thereon a series of sets of windings connected in series with each other and in series with the armature, each of said cores having a shunt-winding and said shunt-windings being connected in series with each other and bridging the armature and series field windings, a controller having a series of contact-points each respectively connected with one of the joints between successive series windings, and a controller-arm movable along said series of contact-points and adapted to successively short-circuit said series windings and thereby reverse the direction of the current in such short-circuited windings, substantially as described.

5. In a motor, the combination of a field-magnet comprising a plurality of cores, a plurality of sets of windings on each of said cores, the sets on each core being in series with each other and in parallel with the windings on the other cores and said field-windings being in series with the armature, and a controller having a series of contact-points each connected respectively with the corresponding joint between the windings on each of the field-cores, and a member movable along said series of contact-points for successively short-circuiting corresponding sets of windings on each field-core, and a shunt-conductor bridging the armature and field windings and adapted to cause a reversal of the current in the short-circuited field-windings and thereby control the speed of the motor.

6. In a motor, the combination of a field-magnet comprising a pair of opposed cores each having thereon a series of sets of windings, said windings on each core being in parallel with those on the other core and in series with the armature, additional windings on each of said cores connected in shunt with the armature and with said series windings, and a controller adapted to successively short-circuit certain sets of said series field-windings and connect the same in shunt with the armature and thereby cause a reversal of the current in said certain windings for controlling the motor.

Signed at Chicago this 19th day of May, 1906.

AUSTIN KIMBLE.

Witnesses:
 EUGENE A. RUMMLER,
 L. A. SMITH.